(12) United States Patent
Bonnville

(10) Patent No.: US 6,435,584 B1
(45) Date of Patent: Aug. 20, 2002

(54) EXTRUDED NODE FOR ATTACHING BODY MOUNT BUSHINGS TO TUBULAR VEHICLE FRAME COMPONENTS

(75) Inventor: Kenneth J. Bonnville, Reading, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/478,105

(22) Filed: Jan. 4, 2000

Related U.S. Application Data

(60) Provisional application No. 60/126,106, filed on Mar. 24, 1999.

(51) Int. Cl.[7] .............................................. B60R 27/00
(52) U.S. Cl. ..................... 296/35.1; 296/35.3; 296/204; 280/781
(58) Field of Search .............................. 296/35.3, 35.1, 296/204, 205; 280/781, 107

(56) References Cited

U.S. PATENT DOCUMENTS

| | | | |
|---|---|---|---|
| 4,988,230 A | | 1/1991 | Banthia et al. |
| 5,005,864 A | * | 4/1991 | Chachere ................ 296/35.1 X |
| 5,059,056 A | | 10/1991 | Banthia et al. |
| 5,219,439 A | * | 6/1993 | Moore et al. ............. 296/35.1 |
| 5,344,187 A | * | 9/1994 | Kreis et al. ............. 296/205 X |
| 5,352,011 A | * | 10/1994 | Kihara et al. ........... 296/35.1 X |
| 5,397,115 A | | 3/1995 | Vlahovic |
| 5,409,283 A | * | 4/1995 | Ban .......................... 296/35.1 |
| 5,458,393 A | * | 10/1995 | Benedyk ................. 296/205 X |
| 5,486,031 A | * | 1/1996 | Roncheti et al. ....... 296/35.3 X |
| 5,609,004 A | | 3/1997 | Kreis |
| 5,947,519 A | * | 9/1999 | Aloe et al. .............. 296/205 X |

FOREIGN PATENT DOCUMENTS

| | | | | |
|---|---|---|---|---|
| GB | | 2178701 | * 2/1987 | ................ 296/35.3 |

* cited by examiner

Primary Examiner—Joseph D. Pape
(74) Attorney, Agent, or Firm—MacMillan, Sobanski & Todd, LLC

(57) ABSTRACT

A body mount bushing connects the structural components of a frame portion of a vehicular body and frame assembly together and provides a mounting support for connecting a body portion of the assembly to the frame portion. Each of the body mount bushings includes a hollow cylindrical bushing portion having one or more V-shaped projections extending therefrom. An end of a first structural component and an end of a second structural component can be formed having respective recesses, within with the projections of the body mount bushing extend. The structural components may be secured to the projections of the body mount bushing by welding, riveting, bolting, and the like. The body mount bushings also provide a mounting support for connecting the body portion to the frame portion. To accomplish this, the bushing portions of the body mount bushings are sized to receive and support respective body mounts provided on the body portion of the vehicular body and frame assembly.

19 Claims, 5 Drawing Sheets

EXTRUDED NODE FOR ATTACHING BODY MOUNT BUSHINGS TO TUBULAR VEHICLE FRAME COMPONENTS

This patent application claims priority of U.S. Provisional Patent Application 60/126,106 filed Mar. 24, 1999.

BACKGROUND OF THE INVENTION

This invention relates in general to body and frame assemblies for use in vehicles. In particular, this invention relates to a structure for connecting a body mount bushing to one or more tubular members that are formed from closed channel structural members in such a vehicular body and frame assembly.

Many land vehicles in common use, such as automobiles, vans, and trucks, include a body and frame assembly that is supported upon a plurality of ground engaging wheels by a resilient suspension system. The structures of known body and frame assemblies can be divided into two general categories, namely, separate and unitized. In a typical separate body and frame assembly, the structural components of the frame portion are separate and independent from the structural components of the body portion. Thus, the frame portion of the assembly serves as a platform upon which the structural components of the body portion and other components of the vehicle can be mounted. When assembled, the structural components frame portion of the assembly are resiliently supported upon the vehicle wheels by the suspension system. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modem vehicles, such as automobiles and minivans.

In both types of vehicular body and frame assemblies, it is known to provide a plurality of body mounts to facilitate the connection of various components thereto. For example, in a typical separate body and frame assembly, a plurality of body mounts are secured to the frame portion to facilitate the connection of the structural components of the body portion and other components of the vehicle thereto. Similarly, in a typical unitized body and frame assembly, a plurality of body mounts are secured to the components of the assembly to facilitate the connection of other components of the vehicle thereto. In both instances, the body mounts are usually provided with a resilient damper that prevents direct metal-to-metal contact between the adjacent components, thereby reducing the amount of vibrations that are transmitted therethrough.

Traditionally, the various components of vehicular body and frame assemblies have been formed from open channel structural members, i.e., structural members that have a non-continuous cross sectional shape (such as U-shaped or C-shaped channel members, for example). For example, it is known to use one or more open channel structural members to form the side rails, the cross members, and other components of a ladder frame type of separate body and frame assembly. To facilitate the connection of the body portion to the frame portion, a plurality of body mount support brackets are secured to the side rails of the frame portion. Such body mount support brackets have traditionally been formed from stampings that were bent or otherwise deformed to desired shapes to provide supports for the body mounts used to connect the various structural members of the body portion thereto. The use of such stamped body mount support brackets was relatively easy with traditional open channel structural members used to form the ladder frame assembly because both the stamped body mount brackets and the side rails were generally rectilinear in shape.

However, the use of open channel structural members to form the various components of vehicular body and frame assemblies has been found to be undesirable for several reasons. First, it is relatively time consuming and expensive to bend portions of such components to conform to a desired final shape, as is commonly necessary. Second, after such bending has been performed, a relatively large number of brackets or other mounting devices must usually be secured to some or all of such components to facilitate the attachment of the various parts of the vehicle to the body and frame assembly. Third, in some instances, it has been found difficult to maintain dimensional stability throughout the length of such components, particularly when two or more components are welded or otherwise secured together.

To address this, it has been proposed to form one or more of the components of the vehicular body and frame assemblies from closed channel structural members, i.e., structural members that have a continuous cross sectional shape (such as tubular or box-shaped channel members, for example). This cross sectional shape is advantageous because it provides strength and rigidity to the vehicle body and frame component. Also, in those instances where the vehicle body and frame component has a generally rectilinear cross sectional shape, vertically and horizontally oriented surfaces are provided that are well adapted to have the body mount support brackets discussed above secured thereto. However, in other instances where the vehicle body and frame components do not have a generally rectilinear cross sectional shape, such as those having circular or irregular cross sectional shapes, it has been found to be relatively difficult to secure the body mount support brackets discussed above. Thus, it would be desirable to provide a structure for connecting a body mount to one or more tubular members in a vehicular body and frame assembly.

SUMMARY OF THE INVENTION

This invention relates to an improved structure for connecting a body mount to one or more tubular structural members in a vehicular body and frame assembly. The vehicular body and frame assembly can include a pair of side rails having a plurality of cross members extending therebetween. Each of the side rails can be formed from a plurality of side rail sections that are secured together by body mount bushings. The body mount bushing includes a hollow cylindrical bushing portion having one or more V-shaped projections extending therefrom. The body mount bushings are provided to connect the adjacent structural components of the frame portion together. To accomplish this, an end of a first structural component and an end of a second structural component can be formed having respective recesses, within which the projections of the body mount bushing extend. Preferably, such recesses are complementary in shape with the shape of the projections. The structural components may be secured to the projections of the body mount bushing by any conventional means, such as by welding, riveting, bolting, and the like. The body mount bushings also provide a mounting support for connecting the body portion to the frame portion. To accomplish this, the bushing portions of the body mount bushings are sized to receive and support respective body mounts provided on the body portion of the vehicular body and frame assembly. The body mount bushings are preferably formed by a conventional extrusion process and cut to a desired shorter length as desired for securement to the adjacent structural components of the frame-portion.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
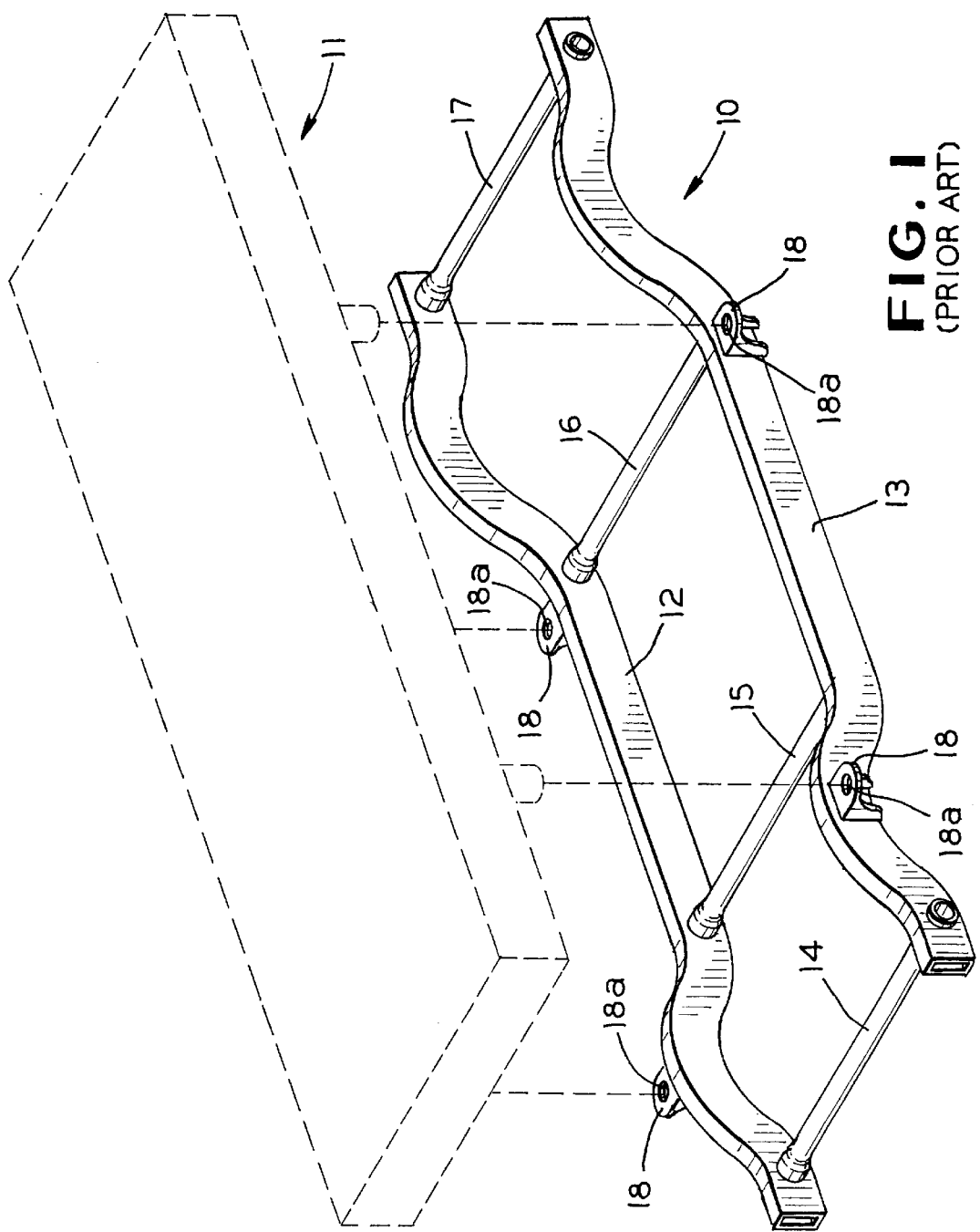
FIG. 1 is a perspective view of a portion of a prior art vehicular body and frame assembly having a plurality of body mount support brackets secured thereto in a conventional manner.

Referring now to the drawings, there is illustrated in FIG. 1 a portion of a vehicular body and frame assembly that is conventional in the art. The illustrated vehicular body and frame assembly is a separate type of body and frame assembly, including a frame portion, indicated generally at 10, and a body portion, indicated generally at 11 as described above. The illustrated frame portion 10 of the vehicular body and frame assembly is a ladder type frame portion, including a pair of longitudinally extending side rails 12 and 13 having a plurality of transverse cross members 14, 15, 16, and 17 extending therebetween. The side rails 12 and 13 extend longitudinally throughout the entire length of the frame portion 10 and are generally parallel to one another. Each of the side rails 12 and 13 in the illustrated embodiment is formed from a single closed channel structural member. However, it is known that one or both of the side rails 12 and 13 may be formed from a plurality of individually formed closed channel structural members that are secured together by any conventional means, such as by welding, riveting, bolting, and the like. Furthermore, it is known that portions or all of the side rails 12 and 13 may be formed from open channel structural members.

The cross members 14 through 17 extend generally perpendicular to the side rails 12 and 13 and may be formed having any conventional structure. The cross members 14 through 17 are spaced apart from one another along the length of the frame portion 10 and can be secured to the side rails 12 and 13 by any conventional means, such as by welding, riveting, bolting, and the like. When secured to the side rails 12 and 13, the cross members 14 through 17 provide lateral and torsional rigidity to the frame portion assembly 10 of the vehicular body and frame assembly. In the illustrated embodiment, each of the side rails 12 and 13 is formed having a generally hollow rectangular cross sectional shape throughout most of the length thereof. Thus, the first and second side rails 12 and 13 each have generally horizontally extending upper and lower surfaces and generally vertically extending inner and outer sides.

A plurality of body mount support brackets 18 are provided on the vehicle frame assembly 10. The illustrated body mount support brackets 18 are stamped members that are secured to the side rails 11 and 12 of the vehicular body and frame assembly 10 by any conventional means, such as by welding, adhesives, and the like. The body mount support brackets 18 are provided to facilitate the connection of the body portion 11 and other various components (not shown) of the vehicle to the vehicular body and frame assembly 10. To accomplish this, each of the body mount brackets 18 has an opening 18a formed therethrough. The openings 18a are sized in accordance with respective body mounts 11a provided on the body portion 11 of the vehicular body and frame assembly. In a manner that is well known in the art, the body mounts 11a are received and supported within the openings 18a of the body mount support brackets 18 to connect the body portion 11 to the frame portion 10.

Figure 2:
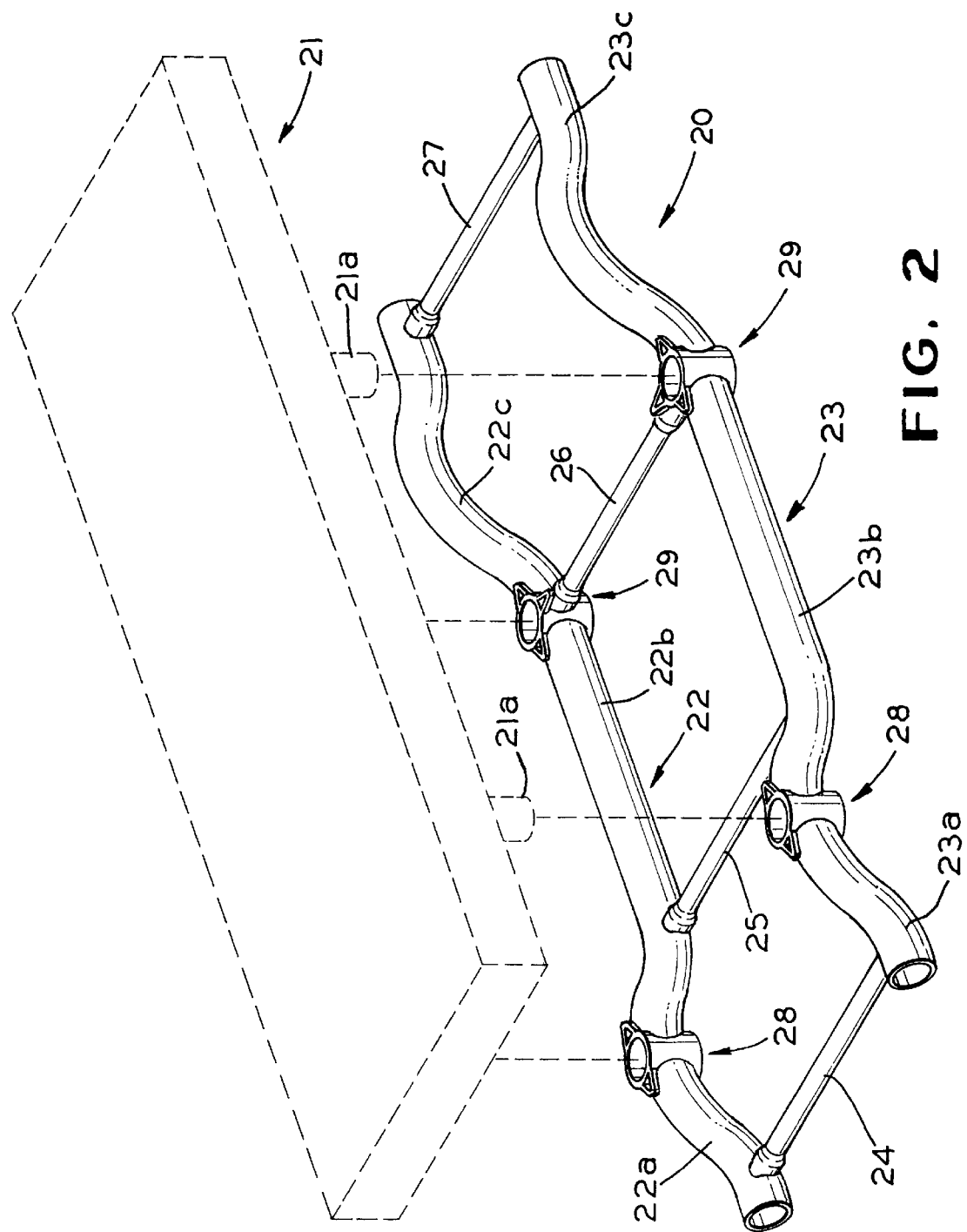
FIG. 2 is a perspective view of a portion of a vehicular body and frame assembly including a plurality of body mount bushings in accordance with this invention.

Referring now to FIG. 2, there is illustrated a portion of a vehicular body and frame assembly in accordance with this invention. The illustrated vehicular body and frame assembly is a separate type of body and frame assembly, including a frame portion, indicated generally at 20, and a body portion, indicated generally at 21 as is described above. Although this invention will be described and illustrated in the context of a separate type of vehicular body and frame assembly, it will be appreciated that this invention may be used in a unitized type of vehicular body and frame assembly.

The illustrated frame portion 20 of the vehicular body and frame assembly is a ladder type frame portion, including a pair of longitudinally extending side rails, indicated generally at 22 and 23, having a plurality of transverse cross members 24, 25, 26, and 27 extending therebetween. The side rails 22 and 23 extend longitudinally throughout the entire length of the frame portion 20 and are generally parallel to one another. Each of the side rails 22 and 23 in the illustrated embodiment is formed from a plurality of tubular closed channel structural members, each having a generally circular cross sectional shape, although such is not required. In the illustrated embodiment, the side rail 22 is formed from a front side rail section 22a, a center side rail section 22b, and a rear side rail section 22c that are secured together in the manner described below. Similarly, the side rail 23 is formed from a front side rail section 23a, a center side rail section 23b, and a rear side rail section 23c that are secured together in the manner described below. However, it is known that one or both of the side rails 22 and 23 may be formed from a greater or less number of such individually formed side rail sections.

The cross members 24 through 27 extend generally perpendicular to the side rails 22 and 23 and may be formed having any conventional structure. The cross members 24 through 27 are spaced apart from one another along the length of the frame portion 20. When secured to the side rails 22 and 23, the cross members 24 through 27 provide lateral and torsional rigidity to the frame portion assembly 20 of the vehicular body and frame assembly. The cross members 24, 25, and 27 can be secured to the side rails 22 and 23 by any conventional means, such as by welding, riveting, bolting, and the like. The cross member 26 is secured to the side rails 22 and 23 in the manner described below.

A first embodiment of a body mount bushing, indicated generally at 28, in accordance with this invention, is provided for connecting the front side rail section 22a of the side rail 22 to the center side rail section 22b thereof, and for connecting the front side rail section 23a of the side rail 23 to the center side rail section 23b thereof. Similarly, a second embodiment of a body mount bushing, indicated generally at 29, in accordance with this invention, is provided for connecting the center side rail section 22b of the side rail 22 to the rear side rail section 22c thereof, and for connecting the center side rail section 23b of the side rail 23 to the rear side rail section 23c thereof. The structure of one of the body mount bushings 28 is illustrated in detail in FIG. 3. As shown therein, the body mount bushing 28 includes a bushing portion 28 having a pair of opposed projections 28b extending therefrom. The illustrated bushing portion 28a is generally hollow and cylindrical in shape, although such is not necessary, and defines a generally cylindrical interior for a purpose that will be described below. The illustrated projections 28b are generally hollow and V-shaped, although such is not necessary, defining a generally triangular interior. The body mount bushings 29 are formed in a similar manner, except that three of such projections are provided thereon. It will be appreciated that the projections 28b may be formed having any desired shape.

The body mount bushings 28 and 29 are provided for two general purposes. First, the body mount bushings 28 and 29 are provided to connect the adjacent structural components of the frame portion 20 together. To accomplish this, the rear end of the front side rail section 23a and the forward end of the center side rail section 23b are formed having respective recesses, within which the projections 28b of the body mount bushing 28 extend. Preferably, such recesses are complementary in shape with the shape of the projections 28b, although such is not necessary The front side rail section 23a and the center side rail section 23b may be secured to the projections 28b of the body mount bushing 28 by any conventional means, such as by welding, riveting, bolting, and the like. Thus, the body mount bushing 28 functions in the manner of a node to facilitate the formation of a joint between the front side rail section 23a and the center side rail section 23b. The body mount bushings 29 are of similar structure and operate in a similar manner, having projections that facilitate the formation of a joint between the center side rail section 23b, the cross member 26, and the rear side rail section 23c. To that end, the ends of the center side rail section 23b, the cross member 26, and the rear side rail section 23c are also formed having similar recesses that are preferably complementary in shape to the projections provided on the body mount bushings 29.

Figure 3:
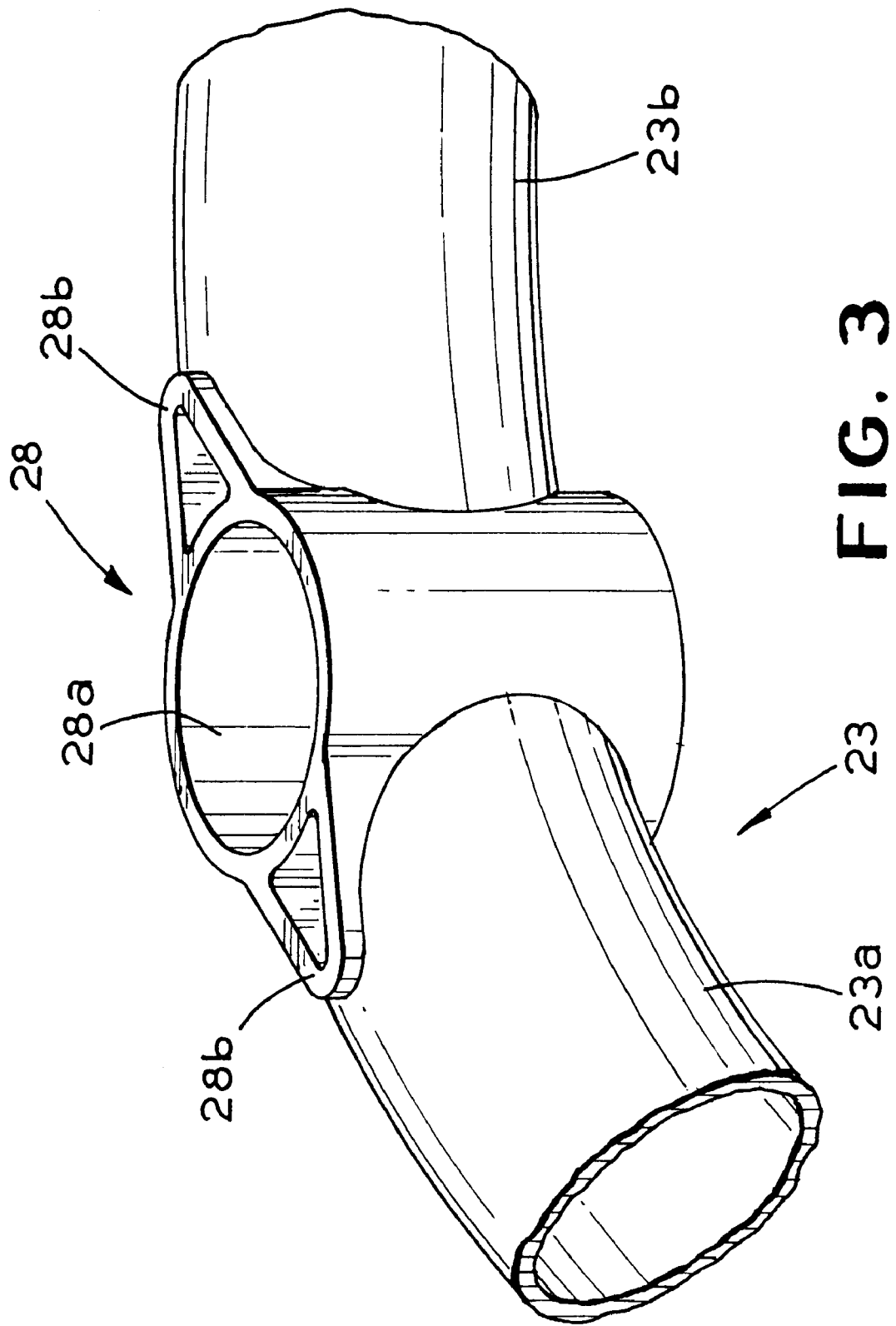
FIG. 3 is an enlarged perspective view of a portion of the vehicular body and frame assembly and one of the body mount bushings illustrated in FIG. 2.

Second, the body mount bushings 28 and 29 provide a mounting support for connecting the body portion 21 to the frame portion 20. To accomplish this, the bushing portions 28a of the body mount bushings 28 and the bushing portions of the body mount bushings 29 illustrated in FIG. 3 are sized to receive and support respective body mounts 21a provided on the body portion 21 of the vehicular body and frame assembly. In a manner that is similar to the prior art structures described above, the body mounts 21 a are received and supported within the openings bushing portions 28a of the body mount bushings 28 to connect the body portion 21 to the frame portion 20. Thus, the body mount bushings 28 and 29 of this invention function not only to connect the adjacent structural components of the frame portion 20 together, but also function to provide a mounting support for connecting the body portion 21 to the frame portion 20.

The body mount bushings 28 and 29 can be formed by any conventional method. However, it is preferred that the body mount bushings 28 and 29 be formed by conventional extrusion processes. Extrusions having the cross sectional shape of the body mount bushings 28 and 29 can be formed having a predetermined length for use in the vehicular body and frame assembly. Alternatively, such extrusions can be formed to a stock length, then cut to a desired shorter length as desired for securement to the adjacent structural components of the frame portion 20.

Figure 4:
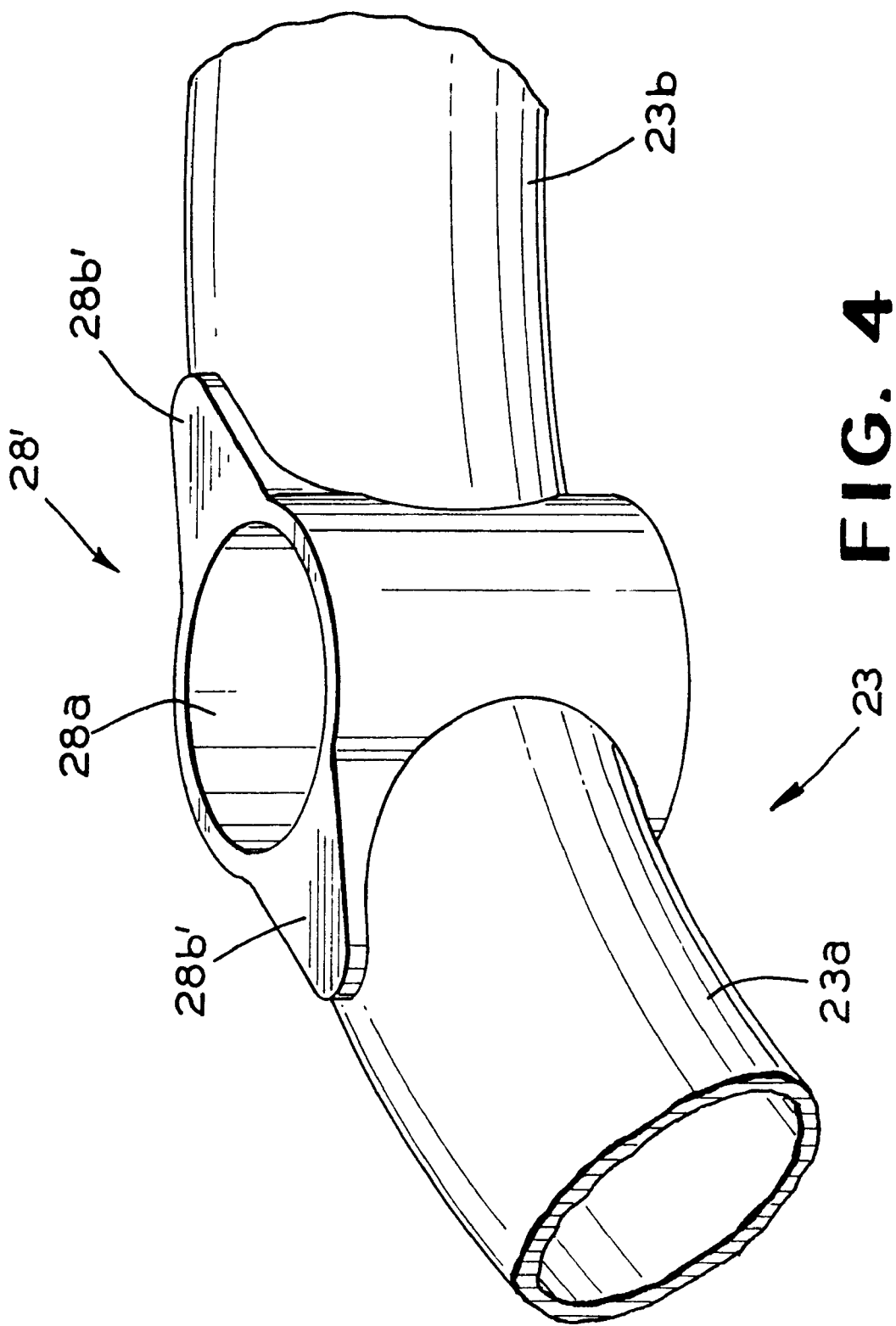
FIG. 4 is an enlarged perspective view similar to FIG. 2 of a portion of the vehicular body and frame assembly and a first alternative embodiment of one of the body mount bushings in accordance with this invention.

FIG. 4 illustrates a first alternative embodiment of a body mount bushing, indicated generally at 28', in accordance with this invention. The body mount bushing 28' is similar to the body mount bushing 28 described above, and like reference numbers are used to indicate similar structures. In this embodiment, however, the illustrated projections 28b' are solid and V-shaped, not hollow as described above.

Figure 5:
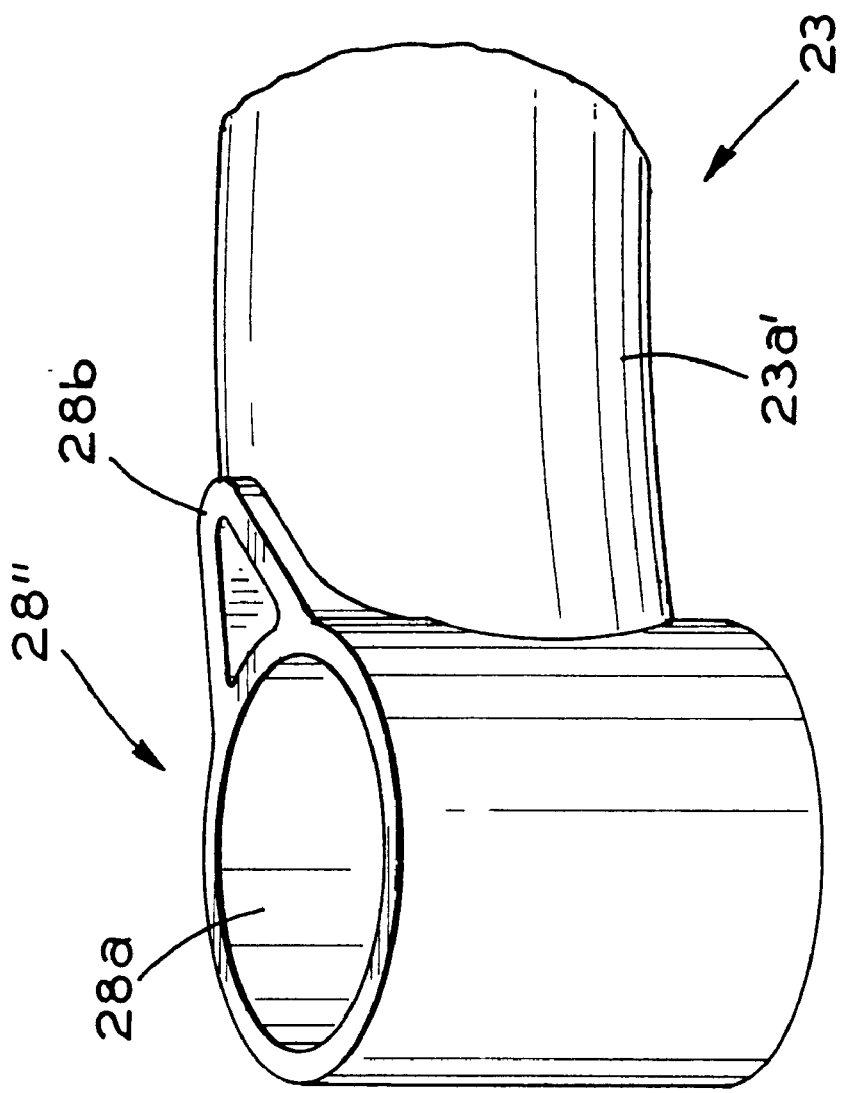
FIG. 5 is an enlarged perspective view similar to FIG. 2 of a portion of the vehicular body and frame assembly and a second alternative embodiment of one of the body mount bushings in accordance with this invention.

FIG. 5 illustrates a second alternative embodiment of a body mount bushing, indicated generally at 28", in accordance with this invention. The body mount bushing 28" is also similar to the body mount bushing 28 described above, and like reference numbers are used to indicate similar structures. In this embodiment, however, the body mount bushing 28" is provided with only a single projection 28b that is connected to a single structural component of the frame portion 20 in the manner described above. For example, the body mount bushing 28" can be connected to the front end of a modified front side rail section 23a' in the manner described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A vehicular body and frame assembly comprising:
   a frame portion including a pair of side rails having a plurality of cross members extending therebetween, one of said side rails and said cross members including an end having a recess formed therein, said frame portion further including a body mount bushing including a hollow bushing portion and a projection extending from said bushing portion, said projection being received in said recess formed in said end of said one of said side rails and said cross members; and
   a body portion including a body mount, said body mount being received and supported in said bushing portion of said body mount bushing to support said body portion on said frame portion to form a vehicular body and frame assembly.

2. The vehicular body and frame assembly defined in claim 1 wherein one of said side rails includes a first side rail section having an end having a first recess formed therein and a second side rail section having an end having a second recess formed therein, and wherein said body mount bushing includes a first projection that is received in said first recess and a second projection that is received in said second recess.

3. The vehicular body and frame assembly defined in claim 1 wherein one of said side rails has an end having a first recess formed therein and one of said cross members has an end having a second recess formed therein, and wherein said body mount bushing includes a first projection that is received in said first recess and a second projection that is received in said second recess.

4. The vehicular body and frame assembly defined in claim 1 wherein one of said side rails includes a first side rail section having an end having a first recess formed therein and a second side rail section having an end having a second recess formed therein, and wherein one of said cross members has an end having a third recess formed therein, and wherein said body mount bushing includes a first projection that is received in said first recess, a second projection that is received in said second recess, and a third projection that is received in said third recess.

5. The vehicular body and frame assembly defined in claim 1 wherein said projection is hollow.

6. The vehicular body and frame assembly defined in claim 1 wherein said projection is solid.

7. The vehicular body and frame assembly defined in claim 1 wherein said recess is complementary in shape with said projection.

8. The vehicular body and frame assembly defined in claim 1 wherein said recess and said projection are generally V-shaped.

9. The vehicular body and frame assembly defined in claim 1 wherein said bushing portion of said body mount bushing is generally hollow and cylindrical in shape.

10. The vehicular body and frame assembly defined in claim 1 wherein said one of said side rails and said cross members is secured to said body mount bushing by one of welding, riveting, and bolting.

11. The vehicular body and frame assembly defined in claim 1 wherein each of a plurality of said side rails and said cross members includes an end having a recess formed therein, said frame portion further including a plurality of body mount bushings, each including a hollow bushing portion and a projection extending from said bushing portion, said projections being received in said recesses formed in said ends of said plurality of said side rails and said cross members, and wherein said body portion includes a plurality of body mounts that are received and supported in said bushing portions of said plurality of body mount bushings.

12. A vehicular body and frame assembly comprising: a frame portion including:
    a first side rail including a first side rail section having an end with a first recess formed therein, a second side rail section having an end with a second recess formed therein, and a first body mount bushing including a hollow bushing portion, a first projection extending from said bushing portion and received in said first recess, and a second projection extending from said bushing portion and received in said second recess;
    a second side rail including a first side rail section having an end with a first recess formed therein, a second side rail section having an end with a second recess formed therein, and a second body mount bushing including a hollow bushing portion, a first projection extending from said bushing portion and received in said first recess, and a second projection extending from said bushing portion and received in said second recess; and
    a plurality of cross members extending between said first and second side rails; and
    a body portion including a pair of body mounts, said body mounts being received and supported in said bushing portions of said body mount bushings to support said body portion on said frame portion to form a vehicular body and frame assembly.

13. The vehicular body and frame assembly defined in claim 12 wherein one of said plurality of cross members has a first end having a first recess formed therein and a second end having a second recess formed therein, and wherein said first body mount includes a third projection extending from said bushing portion and received in said first recess of said one of said plurality of cross members, and wherein said second body mount includes a third projection extending from said bushing portion and received in said second recess of said one of said plurality of cross members.

14. The vehicular body and frame assembly defined in claim 12 wherein each of said projections is hollow.

15. The vehicular body and frame assembly defined in claim 12 wherein each of said projections is solid.

16. The vehicular body and frame assembly defined in claim 12 wherein each of said recesses is complementary in shape with each of said projections.

17. The vehicular body and frame assembly defined in claim 12 wherein each of said recesses and each of said projections are generally V-shaped.

18. The vehicular body and frame assembly defined in claim 12 wherein each of said bushing portions of said body mount bushings is generally hollow and cylindrical in shape.

19. The vehicular body and frame assembly defined in claim 1 wherein each of said side rail sections is secured to each of said body mount bushings by one of welding, riveting, and bolting.

* * * * *